United States Patent
Wang

(10) Patent No.: US 8,741,039 B2
(45) Date of Patent: Jun. 3, 2014

(54) PERMANENT INK COMPOSITIONS AND WRITING INSTRUMENTS CONTAINING SAME

(75) Inventor: Xiaomang Wang, Lake Bluff, IL (US)

(73) Assignee: Sanford, L.P., Oak Brook, IL (US)

( * ) Notice: Subject to any disclaimer, the term of this patent is extended or adjusted under 35 U.S.C. 154(b) by 666 days.

(21) Appl. No.: 11/677,453

(22) Filed: Feb. 21, 2007

(65) Prior Publication Data

US 2008/0196620 A1    Aug. 21, 2008

(51) Int. Cl.
*C09D 11/00* (2006.01)
*C09D 11/16* (2006.01)

(52) U.S. Cl.
USPC .................... 106/31.27; 106/31.93

(58) Field of Classification Search
USPC .............................. 106/31.27, 31.6
See application file for complete search history.

(56) References Cited

U.S. PATENT DOCUMENTS

| | | |
|---|---|---|
| 4,242,244 A | 12/1980 | Malatesta |
| 4,251,276 A | 2/1981 | Ferree, Jr. et al. |
| 4,321,093 A | 3/1982 | Seitz |
| 4,349,639 A | 9/1982 | Muller |
| 4,407,985 A | 10/1983 | Muller |
| 4,629,748 A | 12/1986 | Miyajima et al. |
| 4,687,791 A | 8/1987 | Miyajima et al. |
| 4,721,739 A * | 1/1988 | Brenneman et al. .......... 523/161 |
| 4,889,877 A | 12/1989 | Seitz |
| 5,167,704 A | 12/1992 | Brower |
| 5,231,117 A | 7/1993 | Seitz |
| 5,324,764 A | 6/1994 | Fujita et al. |
| 5,378,739 A | 1/1995 | Koike et al. |
| 5,554,217 A | 9/1996 | Babler |
| 5,561,175 A | 10/1996 | Imagawa |
| 5,622,548 A | 4/1997 | Zou et al. |
| 5,677,363 A | 10/1997 | Imagawa |
| 5,702,512 A | 12/1997 | Yano et al. |
| 5,837,753 A | 11/1998 | Caputo |
| 5,854,320 A | 12/1998 | Nakamura et al. |
| 5,919,838 A | 7/1999 | Mizobuchi |
| 5,945,484 A | 8/1999 | Fukasawa |
| 5,980,624 A | 11/1999 | Ichikawa |
| 6,011,083 A | 1/2000 | Okuda et al. |
| 6,113,679 A | 9/2000 | Adkins et al. |
| 6,140,391 A | 10/2000 | Zou et al. |
| 6,160,035 A | 12/2000 | Idogawa |
| 6,165,258 A | 12/2000 | Asada et al. |
| 6,283,029 B1 | 9/2001 | Tashiro et al. |
| 6,306,929 B1 | 10/2001 | Amon et al. |
| 6,379,444 B1 * | 4/2002 | Adkins et al. ................ 106/31.6 |
| 6,398,441 B1 | 6/2002 | Takayanagi |
| 6,425,948 B1 | 7/2002 | Nowak et al. |
| 6,444,019 B1 * | 9/2002 | Zou et al. ..................... 106/31.4 |
| 6,503,965 B1 | 1/2003 | Nowak et al. |
| 6,527,845 B1 | 3/2003 | Tsuchiya et al. |
| 6,562,116 B1 | 5/2003 | Satoh |
| 6,632,859 B1 | 10/2003 | Jones et al. |
| 6,706,098 B2 | 3/2004 | Leu et al. |
| 6,730,153 B2 | 5/2004 | Tsuchiya et al. |
| 6,762,216 B2 | 7/2004 | Fukuda et al. |
| 6,776,829 B2 | 8/2004 | Miyamoto et al. |
| 7,008,744 B2 | 3/2006 | Horie et al. |
| 7,014,698 B2 | 3/2006 | Mizutani et al. |
| 7,022,172 B2 | 4/2006 | Ohkawa et al. |
| 7,071,245 B2 | 7/2006 | Ichikawa |
| 7,115,161 B2 | 10/2006 | Magdassi et al. |
| 7,125,447 B2 | 10/2006 | Sugita et al. |
| 7,132,013 B2 | 11/2006 | Mizutani et al. |
| 7,132,014 B2 | 11/2006 | Mizutani et al. |
| 7,156,909 B2 | 1/2007 | Oyanagi et al. |
| 2003/0032697 A1 | 2/2003 | Koga et al. |
| 2003/0050361 A1 | 3/2003 | Wang et al. |
| 2003/0050363 A1 | 3/2003 | Suzuki et al. |
| 2003/0055127 A1 * | 3/2003 | Chen et al. .................... 523/160 |
| 2003/0055128 A1 | 3/2003 | Jakubchak |
| 2003/0069328 A1 | 4/2003 | Fukuda et al. |
| 2003/0177946 A1 | 9/2003 | Tsuchiya et al. |
| 2004/0006159 A1 | 1/2004 | Horie et al. |
| 2004/0082684 A1 | 4/2004 | Nagayama et al. |
| 2004/0138334 A1 | 7/2004 | Rosenbaum et al. |
| 2004/0194658 A1 | 10/2004 | Konno et al. |
| 2005/0137285 A1 | 6/2005 | Yano et al. |
| 2005/0148689 A1 | 7/2005 | Mizutani et al. |
| 2005/0171236 A1 | 8/2005 | Johnke et al. |
| 2005/0192378 A1 | 9/2005 | Uang |
| 2005/0239919 A1 | 10/2005 | Ono |

(Continued)

FOREIGN PATENT DOCUMENTS

| | | |
|---|---|---|
| EP | 0229377 | 7/1987 |
| JP | 403378 | 2/1960 |

(Continued)

OTHER PUBLICATIONS

International Search Report for International Application No. PCT/US2008/054364, dated Jun. 2, 2008.

(Continued)

*Primary Examiner* — Veronica F Faison
(74) *Attorney, Agent, or Firm* — Marshall, Gerstein & Borun LLP

(57) ABSTRACT

The ink compositions comprise at least one solvent, at least one colorant, and at east one oil, and may be delivered from any of a variety of writing instruments including but not limited to ball pens, fountain pens, felt tip pens, and markers.

7 Claims, No Drawings

(56) References Cited

U.S. PATENT DOCUMENTS

| | | |
|---|---|---|
| 2005/0250875 A1 | 11/2005 | Marr et al. |
| 2006/0117996 A1 | 6/2006 | Ichikawa et al. |
| 2007/0000409 A1 | 1/2007 | Sugita et al. |

FOREIGN PATENT DOCUMENTS

| | | |
|---|---|---|
| JP | 60233171 | 11/1985 |
| JP | 11505566 | 7/1987 |
| JP | 62158768 | 7/1987 |
| JP | 5194904 | 8/1993 |
| JP | 07247457 | 9/1995 |
| JP | 2001200185 | 7/2001 |
| JP | 2005048029 | 2/2005 |
| JP | 2006-056931 | 3/2006 |
| WO | WO-00/27935 | 5/2000 |
| WO | WO-00/63307 | 10/2000 |

OTHER PUBLICATIONS

Written Opinion for International Application No. PCT/US2008/054364, dated Jun. 23, 2008.

* cited by examiner

PERMANENT INK COMPOSITIONS AND WRITING INSTRUMENTS CONTAINING SAME

BACKGROUND OF THE DISCLOSURE

1. Field of the Disclosure

The disclosure is generally related to permanent ink compositions and to writing instruments containing such ink compositions.

2. Brief Description of Related Technology

The writing performance of writing instruments including but not limited to ball pens, felt tip pens, fountain pens, and markers can be negatively affected by a phenomenon referred to as "dry out." Dry out occurs because the ink composition contained in a writing instrument can evaporate from an exposed writing point, and leave a solid residue behind. The left over residue can result in the formation of a deposit that is capable of preventing a writing point, e.g., a ball point, from functioning properly, thereby causing the ball pen to write poorly or even fail. Similarly, the left over residue can clog the capillary tubes of fibrous ink reservoirs and/or fibrous nibs in writing instruments that rely upon capillary action, thereby causing such writing instruments to write poorly or even fail.

For this reason, consumers are often advised to cap writing instruments after use. Capping creates a substantially sealed atmosphere around the writing point, and thus lessens dry out. Alternatively, a writing instrument can be made to retract such that its writing point is substantially sealed after retraction—without need for a cap. Such capless retractable pens and markers are well known, and often use twisting or knock-type mechanisms to retract the writing point. However, dry out still can occur even when a can is used or a point of a writing instrument is retracted.

Existing ink compositions often include slow evaporating solvents (e.g., solvents having boiling points greater than about 115° C.), commonly referred to as humectants, in order to mitigate dry out. Such slow evaporating solvents, however, can negatively affect the permanence of n arks written with such ink compositions.

DETAILED DESCRIPTION

One embodiment of the disclosure provides permanent ink compositions having reduced rates of ink evaporation (at least relative to other, comparable solvent-dye based ink compositions). Another embodiment of the disclosure provides writing instruments containing such ink compositions. Yet another embodiment provides methods of making written markings with the disclosed ink compositions.

The disclosed ink compositions may be used in various writing instruments. For example, the ink compositions may be used in various pens including but not limited to ball pens (e.g., ball point pens, gel pens, and roller ball pens) and fountain pens. The disclosed inks are also well-suited for delivery from writing instruments comprising fibrous ink reservoirs and/or fibrous nibs writing instruments, such as felt tip pens and markers (e.g., "free-ink" markers and markers comprising fibrous reservoirs). Advantageously, the ink compositions provide permanent written marks on both porous and non-porous substrates, and good color intensity on porous and non-porous substrates.

In one aspect, the ink compositions comprise at least one solvent, at least one colorant, and at least one oil. The ink compositions may optionally further comprise a resin and one or more additives.

The solvent may be any suitable solvent (or combination thereof), but its interaction with the oil contained in the ink composition is related to obtaining desired performance. Specifically, the oil should not be more than about 50 weight percent ("wt. %") soluble in the employed solvent(s). The ink compositions typically comprise from about 20 wt. % to about 98 wt. %, about 30 wt. % to about 97 wt. %, about 40 wt. % to about 95 wt. %, and/or about 50 wt. % to about 94 wt. % of the solvent(s).

Representative solvents for use in the ink compositions include but are not limited to glycol ethers including but not limited to ethylene glycol monomethyl ether, ethylene glycol monoethyl ether, ethylene glycol monobutyl ether, ethylene glycol monophenyl ether propylene glycol monomethyl ether, propylene glycol monoethyl ether, propylene glycol monobutyl ether, propylene glycol monophenyl ether, and similar solvents, alcohols including but not limited to ethanol, propanols (e.g., n-propanol and isopropanol), butanols (e.g., n-butanol, sec-butanol, isobutanol, tert-butanol) pentanols, hexanols, octanols, and similar solvents, ketones including but not limited to 4-hydroxy-4-methyl-2-pentanone (also known as diacetone alcohol), methyl isobutyl ketone, methyl isopropyl ketone, 2-pentanone, and similar solvents, and mixtures thereof.

The colorant need not be specifically limited and may comprise at least one dye, at least one pigment (either "dry" or as a dispersion), or a combination of at least one dye and at least one pigment; however, dyes are generally preferred for use in the ink compositions. A solvent dye, a polymeric dye, and/or an encapsulated dye (e.g., microsphere encapsulated dyes) are generally used. Pigments and/or dyes can be added to the formulation as dried powders, pigment concentrate chips, granules, and/or (pre-dispersed) dispersions.

Suitable pigments which can be used include but are not limited to titanium dioxide pigments, e.g., titanium dioxide pigments available under the TIPURE® trade name (Du Pont de Nemours, DE), the KRONOS™ trade name (Kronos Inc, Houston, Tex.), and the TIOXIDE® trade name (Huntsman Tioxide, IL). Preferred titanium pigments include TIPURE® R-931, KRONOS™ 2131, KRONOS™ 2102, TIOXIDE® R-XL, and TIOXIDE® TR50, but of course other titanium pigments may also be used.

Additionally, organic pigments may be used. Suitable organic pigments include but are not limited to red, green, blue, yellow, orange, and carbon black pigments (BASF Corporation, NJ; Clariant Corporation, NC; Emerald Hilton Davis, OH; Ciba Specialty Chemicals, Switzerland; Degussa Corporation, NJ; Cabot Corporation, MA; and, Columbian Chemicals Company, GA). Of course, any suitable organic pigment may be used.

Other pigments such as metallic pigments may also be used. Aluminum pigments and bronze pigments are exemplary metallic pigments (Schlenk-BOTH Metallic Pigments, MA; Wolstenholme International Inc., IL; Silberline Manufacturing Co., Inc., PA; Zuxing Enterprise Co., Ltd., China; and, Echart GmbH & Co. KG, Germany).

Further, pearlescent and other special effect pigments may be used (BASF Corporation, NJ; Ciba Specialty Chemicals, Switzerland; and Taizhu, China).

Inorganic colored pigments may also be used. Preferred inorganic colored pigments include but are not limited to colored titanium dioxide pigments available under the TICO™ trade name (Heubach, Germany) and colored mixed metal oxides inorganic pigments (Heubach, Germany and Cerdec Corporation, PA). Other suitable inorganic colored pigments such as colored aluminum pigments can also be used (Showa Aluminum Powder, K.K., Japan).

Similarly, any pigment dispersion in oil or relatively non-polar solvent may be used. Pigment dispersions can either be prepared or purchased (commercially available pigment dispersions). The ink compositions generally comprise about 0.1 wt. % to about 60 wt. %, about 0.1 wt. % to about 50 wt. %, and/or about 0.5 wt. % to about 45 wt. % of the pigment (solids), when present.

Representative commercially available pigment dispersions include but are not limited to alkyd pigment dispersions available under the TINT-AYD® AL trade name (Elementis Specialty, NJ), long oil alkyd dispersions (e.g., Formulator 24 A pigment dispersions available from Emerald Hilton-Davis, LLC, OH), short or medium oil alkyd dispersions (e.g., Industrial 42 A alkyd dispersions available from Emerald Hilton-Davis, LLC, OH), and any other suitable pigment dispersion in oil(s) or hydrocarbon solvent(s), with or without polymer and/or additional dispersing agents.

Alternatively, suitable pigment dispersions can be prepared by dispersing one or more pigments in a relatively non-polar solvent and/or oil. The pigments dispersions can optionally include a polymer and/or a dispersing agent. Many of the pigments (e.g., metallic pigments and pearlescent pigments) do not require special treatment to form a dispersion and can instead be prepared by mixing with solvent and any desired additives.

Suitable dyes include but are not limited to anionic and cationic dyes. The dyes can be basic dyes, direct dyes, solvent dyes, disperse dyes, or reactive dyes. The ink composition typically comprises about 0.01 wt. % to about 30 wt. %, about 0.10 wt. % to about 25 wt. %, about 0.20 wt. % to about 20 wt. %, and/or about 0.50 wt. % to about 20 wt. % of the dye (actives), when present.

Examples of suitable dyes include but are not limited to direct black dyes (e.g., direct black dye nos. 4, 14, 17, 22, 27, 38, 51, 112, 117, 154, 168, and the like), direct blue dyes (e.g., direct blue lye nos. 1, 6, 8, 14, 15, 25, 71, 76, 78, 80, 86, 90, 106, 108, 123, 163, 165, 199, 226, and the like); direct red dyes (e.g., direct red dye nos. 1, 2, 16, 23, 24, 28, 39 62, 72, 227, 236, and the like); direct yellow dyes (e.g., direct yellow dye nos. 4, 11, 12, 27, 28, 33, 34, 39, 50, 58, 86, 100, 106, 107, 118, 127, 132, 142, 157, and the like); anthraquinone dyes; monoazo dyes; disazo dyes; phthalocyanine derivatives, including, for example, various phthalocyanine sulfonate salts; aza annulenes; formazan copper complexes; triphenodioxazines; various reactive dyes, including but not limited to reactive black dyes, reactive blue dyes, reactive red dyes (e.g., reactive red dye nos. 4, 56, 180, and the like), reactive yellow dyes (e.g., reactive yellow dye no. 37, and the like); various solvent dyes including but not limited to solvent yellow dyes (e.g., solvent yellow dye nos. 62, 82, 90, 162, and the like), solvent orange dyes (e.g., solvent orange dye nos. 54, 56, 58, 99, and the like), solvent red dyes (e.g., solvent red dye nos. 89, 119, 122, 132, 160, and the like), solvent blues dyes (e.g., solvent blue dye nos. 45, 48, 70, and the like), solvent black dyes (e.g., solvent black dye nos. 27, 29, and the like), and mixtures thereof. Dyes available under the NEOPEN® trade name (BASF Corp., WI), the VALIFAST® trade name (Orient Corporation of America, NJ), the MORFAST® and NAVIPON® trade names (Sunbelt Corporation, SC), and the SEPISOL™ trade name (Bima 83, FR). Polymeric dyes also are also suitable colorants.

The selected oil(s) typically has the solubility property mentioned above relative to the ink composition solvent(s), but otherwise need not be limited. It is generally suitable when the oil has a solubility in the solvent(s) of 0 wt. % to about 50 wt. %, about 1 wt. % to about 40 wt. %, about 2 wt. % to about 30 wt. %, about 3 wt. % to about 25 wt. %, about 5 wt. % to about 20 wt. %, and/or about 10 wt. % to about 20 wt. %. Additionally, the oil may have a solubility in the solvent of less than about 40 wt. %, less than about 30 wt. %, less than about 25 wt. %, less than about 20 wt. %, less than about 15 wt. %, less than about 10 wt. %, less than about 5 wt. %, less than about 5 wt. %, less than about 2.5 wt. %, and/or less than about 1 wt. %. The oil should not be emulsified into the ink composition. Generally, lower (oil(s) in solvent(s)) solubility values are more preferred for obtaining desired performance.

Suitable oils include but are not limited to semi-drying oils such as soybean oils, cottonseed oils, corn oils, and sesame oils, non-drying oils such as olive oils, peanut oils, mineral oils, and castor oils, petroleum-based oils such as naptthenic process oils and paraffinic process oils, silicone oils, and combinations thereof. Generally, petroleum-based oils and/or non-drying oils are preferred for obtaining desired performance. The oil typically comprises about 0.1 wt. % to about 15 wt. %, about 0.5 wt. % to about 10 wt. %, about 1 wt. % to about 8 wt. %, and/or about 1 wt. % to about 5 wt. % of the ink compositions. Exemplary oils include oils available under the TELURA® trade name (ExxonMobil Lubricants and Petroleum Specialties Co., a division of ExxonMobil Corporation, TX), TUFFLO® trade name (Citgo Petroleum Corporation, TX), and various mineral oils (Penreco, TX).

The ink compositions may optionally further comprise a resin. Suitable resins include but are not limited to rosin and modified rosin resins, alkyd resins, hydrocarbon resins, ketone resins, phenolic resins, acrylic resins, terpene resins, polyamide resins, and combinations thereof. The resin typically comprises about 0.1 wt. % to about 50 wt. %, about 0.5 wt. % to about 35 wt. %, about 1 wt. % to about 25 wt. %, and/or about 2 wt. % to about 20 wt. % of the ink compositions.

Preferably, the resin is soluble in the oil of the ink composition, and this can be beneficial for obtaining markings having good permanency. Typically, the resin has a solubility of greater than about 0.01 grams/mL oil, greater than about 0.05 grams/mL oil, greater than about 0.10 grams/mL oil, greater than about 0.15 grams/mL oil, greater than about 0.20 grams/mL oil, greater than about 0.25 grams/mL oil, and/or greater than about 0.30 grams/mL oil.

Exemplary resins include acrylic resins available under the JONCRYL® trade name (BASF Corp., WI), phenolic resins available under the Bakelite trade name (various), other suitable phenolic resins, e.g., CK-2103, CK-2400, CK-2432, and CK-2500 (Georgia Pacific Resins, Inc., a division of Georgia Pacific, Corp., GA), rosin resins and modified rosin resins available under the SYLVACOTE® and SYLVAPRINT® trade names (Arizona Chemical, FL), hydrocarbon resins available Lnder the SYLVAPRINT® trade name (Arizona Chemical, FL), polyamide resins available under the UNI-REZ® trade name (Arizona Chemical, FL), and mixtures thereof.

The ink compositions may optionally further comprise one or more additives. The additive(s) can be selected from the group consisting of plasticizers, biocides, surface tension modifiers, wetting agents, synergic resins, dispersing agents, defoamers, surfactants, humectants, viscosity modifiers (e.g., thickeners), flow additives, and other additives known in the art. The additives can be added to the ink compositions in an amount such that the overall desired performance of the ink compositions is not adversely affected in any aspect. Preferred surfactants include polydimethylsiloxane surfactants such as those available under the SILWET® trade name (GE Silicones, a division of General Electric Company, CT).

Including slow evaporating solvents (e.g., solvents having boiling points greater than about 115° C.) or humectants such as glycerine and propylene glycol can detrimentally affect the desired permanency of markings made with the ink compositions. Thus, in one aspect, the ink compositions are substantially free of such humectants.

As used herein, the term "substantially free" means that the ink compositions disclosed herein contain less than 2 wt. %, less than 1 wt. %, and/or less than 0.50 wt. % of a referenced component or ingredient.

By including various of the listed additives and/or colorants in the ink compositions, various ink compositions (including highlighting writing inks and other special purpose writing inks) may be formulated, and their viscosities varied from very low values, for example, such as in free ink marker systems and other marker systems (e.g., comprising a fibrous reservoir), to very high values such as in gel pens and in ball point pens. When the ink composition is intended for delivery from a marker system, it generally has a viscosity value at 200 rotations per minute of about 1 centipoise to about 40 centipoises (cps) and/or about 2 cps to about 15 cps. When ink composition is intended for delivery from a ball pen, it generally has a viscosity value of at least about 750 cps and more typically at least about 1000 cps.

The ink compositions in accordance with the disclosure and writing instruments comprising same can be better understood in light of the following examples, which are merely intended to illustrate the ink compositions, and are not meant to limit the scope thereof in any way.

Example 1

Marker Ink Composition

An ink composition was made by dissolving 5.0 grams of a phenolic resin, 7.0 grams of a first dye, and 5.0 grams of a second dye, into a solvent solution comprising 40.20 grams of n-propyl alcohol and 40 grams of ethyl alcohol (200 proof).

2.50 grams of a napthenic process oil and 0.30 grams of a polydimethylsiloxane surfactant were then added.

The ink had a viscosity value (at 200 RPM) of about 2.8.

The ink composition was loaded into a marker (comprising a fibrous reservoir in fluid communication with a fibrous nib) and the marker wrote well.

Example 2

Marker Ink Composition

An ink composition was made by dissolving 3.8 grams of a phenolic resin and 4.5 grams of a dye into a solvent solution comprising 44.3 grams of n-propyl alcohol and 44.5 grams of ethyl alcohol (200 proof).

2.50 grams of a napthenic process oil and 0.40 grams of a polydimethylsiloxane surfactant were then added.

The ink had a viscosity value (at 200 RPM) of about 2.2.

The ink composition was loaded into a marker (comprising a fibrous reservoir in fluid communication with a fibrous nib) and the marker wrote well.

Although the foregoing text is a detailed description of numerous different embodiments of a ink composition in accordance with the disclosure, the detailed description is to be construed as exemplary only and does not describe every possible embodiment of in accordance with the disclosure. Consequently only such limitations as appear in the appended claims should be placed on the invention.

What is claimed is:

1. A permanent ink composition comprising:
   at least one solvent;
   at least one colorant comprising a dye;
   at least one petroleum-based oil comprising naphthenic process oil, and
   a phenolic resin having a solubility of greater than about 10 milligrams resin per milliliter of the petroleum-based oil;
   wherein the petroleum-based oil is 1 weight percent (wt. %) to 40 wt. % soluble in the solvent, and the petroleum-based oil is not emulsified into the ink composition.

2. The ink composition of claim 1, wherein the ink composition is substantially free of humectants.

3. The ink composition of claim 1, wherein the ink composition comprises about 20 wt. % to about 98 wt. % of the solvent, about 0.01 wt. % to about 30 wt. % of the dye, and about 0.5 wt. % to about 10 wt. % of the oil.

4. A writing instrument containing a permanent ink composition comprising: at least one solvent, at least one colorant comprising a dye, at least one petroleum-based oil comprising naphthenic process oil, and a phenolic resin having a solubility of greater than about 10 milligrams resin per milliliter of the petroleum-based oil, wherein the petroleum-based oil is 1 weight percent (wt. %) to 40 wt. % soluble in the solvent and the petroleum-based oil is not emulsified into the ink composition.

5. The writing instrument of claim 4, wherein the writing instrument is selected from the group consisting of ball pens, fountain pens, felt tip pens, and markers.

6. The writing instrument of claim 4, wherein the ink composition is substantially free of humectants.

7. The writing instrument of claim 4, wherein the ink composition comprises about 20 wt. % to about 98 wt. % of the solvent, about 0.01 wt. % to about 30 wt. % of the dye, and about 0.5 wt. % to about 10 wt. % of the oil.

* * * * *